(12) United States Patent
Nakamura

(10) Patent No.: US 6,583,908 B1
(45) Date of Patent: Jun. 24, 2003

(54) DEVICE PROVIDED WITH AN OPTICAL COMMUNICATIONS FUNCTION AND OPTICAL COMMUNICATION SYSTEM

(75) Inventor: Kenji Nakamura, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/286,457

(22) Filed: Apr. 6, 1999

(30) Foreign Application Priority Data

Apr. 7, 1998 (JP) ............................................. 10-094783

(51) Int. Cl.[7] ............................................... H04B 10/00
(52) U.S. Cl. ........................ 359/172; 359/152; 359/110; 359/163; 364/713
(58) Field of Search ................................ 359/172, 110, 359/152, 163; 364/713

(56) References Cited

U.S. PATENT DOCUMENTS

| | | | | |
|---|---|---|---|---|
| 4,306,313 A | * | 12/1981 | Baldwin | ...................... 455/601 |
| 4,456,793 A | * | 6/1984 | Baker et al. | ............... 179/99 R |
| 5,570,220 A | * | 10/1996 | Matsumoto et al. | ......... 359/146 |
| 5,585,953 A | * | 12/1996 | Zavrel | .......................... 359/152 |
| 5,617,236 A | * | 4/1997 | Wang et al. | ................. 359/172 |
| 5,781,321 A | * | 7/1998 | Kobayashi | .................... 359/143 |
| 5,822,099 A | | 10/1998 | Takamasu | |
| 5,909,294 A | * | 6/1999 | Doerr et al. | ................. 359/114 |
| 6,154,300 A | * | 11/2000 | Cho | ............................ 359/172 |
| 6,169,617 B1 | * | 1/2001 | Tsuchiya et al. | ............. 359/152 |
| 6,211,797 B1 | * | 4/2001 | Kimura | ................. 340/825.72 |

FOREIGN PATENT DOCUMENTS

JP          06250952          9/1994

* cited by examiner

Primary Examiner—Leslie Pascal
Assistant Examiner—Hanh Phan
(74) Attorney, Agent, or Firm—McDermott, Will & Emery

(57) ABSTRACT

A device for transmitting and receiving data by optical communications with an external device, provided with a plurality of data transmission\reception units. Sequentially, during data transmission\reception, whether or not a transmission signal has been transmitted from an external device is detected, and it a transmission signal is detected the transmission\reception unit receiving said signal is used for data transmission\reception via optical communications with an external device.

7 Claims, 6 Drawing Sheets

DEVICE PROVIDED WITH AN OPTICAL COMMUNICATIONS FUNCTION AND OPTICAL COMMUNICATION SYSTEM

RELATED APPLICATION

This application is based on Application No. HEI 10-94783 filed in Japan, the content of which is hereby incorporated by reference.

BACKGROUND OF THE INVENTION

1. Field of the Invention

The present invention relates to a device and communications system for transmitting and receiving data via optical communications with another device, said device being provided on a laptop computer, digital camera and the like.

2. Description of the Related Art

Data transmission and reception among a plurality of personal computers, or between a personal computer and various peripheral devices is conventionally achieved through a cable. Infrared transmission\reception (communications) systems using optical communications also are well known as data communication systems not requiring a cable. In such systems, infrared transmission units comprising an LED and sensor are mutually opposed on both devices, so as to transmit data via optical signals between the two devices. IrDA (Infrared Data Association) standards have been proposed as an infrared interface for data communications.

In conventional laptop computers and digital cameras and the like, a single infrared transmission\reception unit is provided at the back or side of the device body. The effective light transmission\reception angle of the infrared transmission\reception unit is about 15 degrees. Accordingly, when conducting infrared communications between two laptop computers, the disposition of the two computers is restricted.

For example, when performing data communications between two laptop computers 100 provided with an infrared transmission\reception unit 102 on the right edge of cover 101 which accommodates a built in liquid crystal display unit, as shown in FIGS. 5a and 5b, the infrared transmission\reception units 102 of both computers 100 are placed facing one another such that both computers 100 are facing mutually opposite directions. For this reason it is difficult for one person to operate both computers 100 to effect the data transmission\reception operation.

FIG. 6 shows a transmission\reception method for transmitting data between laptop computers 100 provided with infrared transmission\reception units 102 on the back. In this instance also the computers 100 are disposed so as to face mutually opposite directions so as to make it difficult for a single person to perform the transmission\reception operation on the two computers 100.

SUMMARY OF THE INVENTION

An object of the present invention is to eliminate the previously mentioned disadvantages.

Another object of the present invention is to increase the freedom of disposition of each device when transmitting\receiving data via optical communications with another device.

Another object of the present invention is to improve the operating characteristics of each device when transmitting\receiving data via optical communications with another device.

Yet another object of the present invention is to provide a device capable of easy data transmission\reception via optical communications with another device.

These and other objects are attained by providing a device having an optical communications function comprising a plurality of communications units for optical communications with other devices, wherein each communication unit includes a detection means for detecting whether or not another device is transmitting, and a communications means for performing communications using the communications unit which detected a transmission from another device.

The aforesaid objects of the present invention are attained by a device provided with a body, a plurality of transmission\reception units provided on different surfaces of the body for optical communications with other devices, a data conversion unit comprising an encoder for encoding information for transmission from the transmission\reception unit to another device and a decoder for decoding encoded information received from another device, a selection means for selecting one transmission\reception unit for handling data with the data conversion unit from among a plurality of transmission\reception units, a switching means for controlling the selection means so as to sequentially switch the transmission\reception units to handle information and the data conversion unit, a detection means for detecting whether or not another device is transmitting, and a communication means for stopping the switching means when transmission from another device is detected and executing optical communications using the selected transmission\reception units.

The invention itself, together with further objects and attendant advantages will be best understood by reference to the following detailed description taken in conjunction with the accompanying drawings.

BRIEF DESCRIPTION OF THE DRAWINGS

In the several descriptions, like parts are designated by like reference numbers throughout the several drawings.

DESCRIPTION OF THE PREFERRED EMBODIMENTS

First Embodiment

Figure 1A:
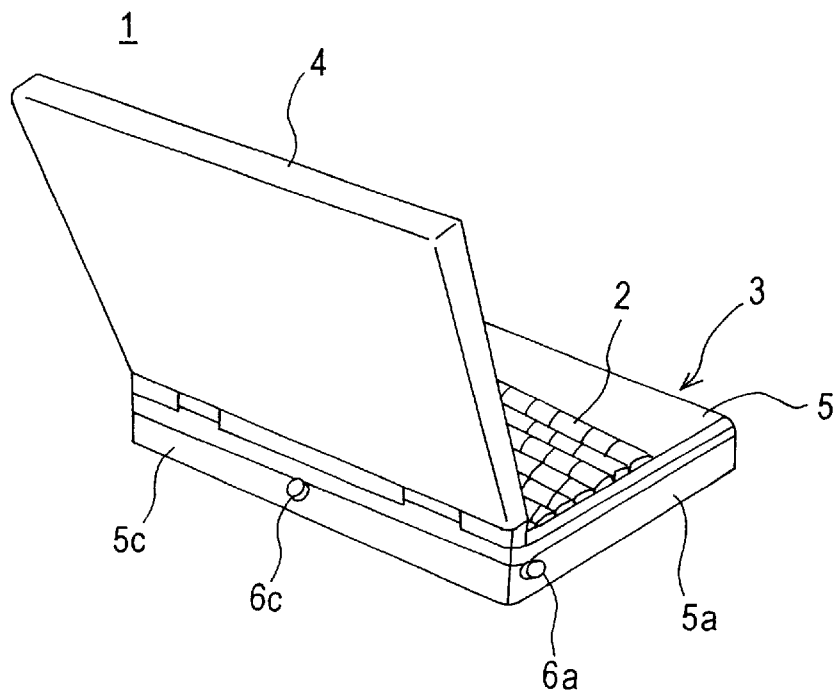
FIG. 1a is an exterior view of a laptop computer provided with an optical communications function of a first embodiment.
Figure 1B:
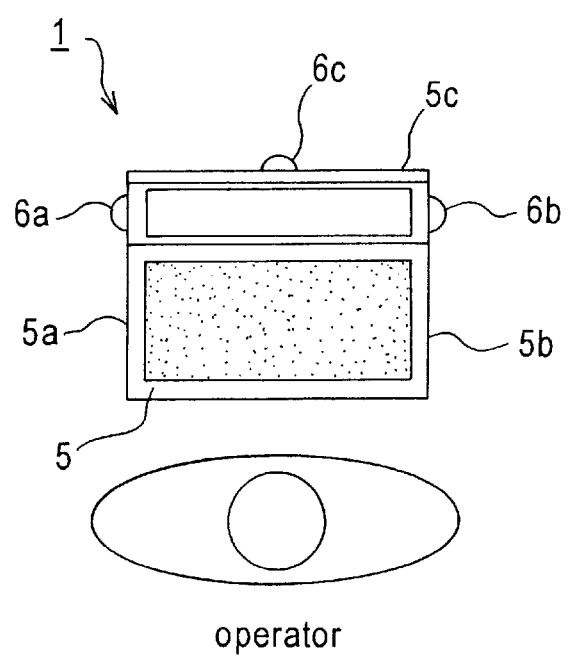
FIG. 1b is a top view of a laptop computer provided with an optical communications function of a first embodiment.

The preferred embodiments of the optical communications device of the present invention are described hereinafter with reference to the accompanying drawings. FIG. 1a is an exterior view of a laptop computer provided with an optical communications function of the present invention, and FIG. 1b is a top view the laptop computer. The laptop computer 1 comprises a body 3 provided with a keyboard 2 and built in a central processing unit (hereinafter referred to as "CPU") an internal hard disk, and a cover 4 provided with a built in display unit (not illustrated). The infrared transmission\reception(communications) units 6a, 6b, 6c are respectively provided left and right surfaces 5a and 5b and the back surface 5c of the case 5 of the body 3 to transmit and receive infrared light when performing a data transmission\reception operation via optical communication with an external device such as another computer.

Figure 2:
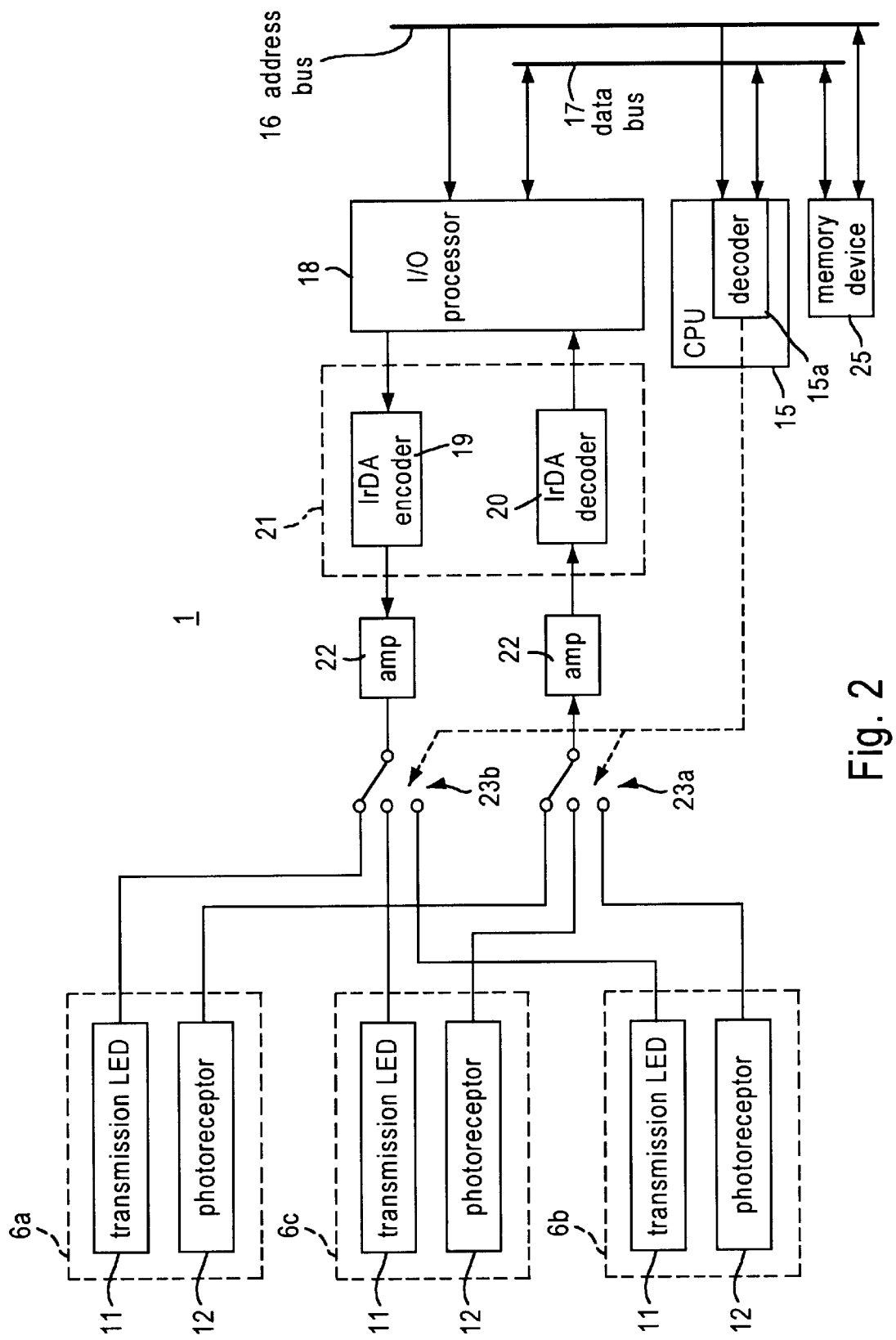
FIG. 2 is a block diagram of the control system controlling optical communications.

FIG. 2 is a block diagram of the control system of the laptop computer 1. The infrared transmission\reception units 6a, 6b, 6c comprise an LED 11 for emitting infrared light, and a photoreceptor 12 for receiving infrared light from an external device and converting said light to electrical signals. The laptop computer 1 is further provided with a CPU 15 for overall control of the device, an I/O processor 18 connected to the address bus 16 of the CPU 15 and a data bus 17, an IrDA encoder 19 for converting to encoded signals the information signals transmitted from the LED 11 to an external device, and an IrDA decoder 20 for converting to information signals the encoded signals received from an external device via the photoreceptor 12. The IrDA encoder 19 and IrDA decoder 20 comprise the data conversion unit 21. Between the infrared transmission\reception units 6a, 6b, 6c and the data converter 21 are provided an amp 22 for amplifying the transmission\reception signals, and selectors 23a and 23b for switching the connection between the infrared transmission\reception units 6a, 6b, 6c and the data conversion unit 21. The selectors 23a and 23b switch the input/output via control signals generated through the decoder 15a provided in the memory space of the CPU 15. This switching is accomplished by software read by the CPU 15. Data received from an external device are stored in memory device 25.

During a data reception operation, electrical signals converted by the photoreception sensor 12 are amplified by the amp 22 via the selector 23a, then encoded in the IrDA decoder 20 , and transmitted to the I/O processing unit 18. In this way, the information signals coded by the decoder 20 are readable by the CPU 15. These information signals are stored in the memory device 25 via the data bus 17. In the data transmission operation, the information signals, i.e., transmission data, stored in the memory device 25 are transferred through the data bus 17 and I/O processing unit 18 to the IrDA encoder 19 and coded. Then, the coded signals are transmitted through the amp 22 and the selector 23b to one transmission LED 11 among the three infrared transmission\reception units 6a, 6b, 6c, and output as optical signals to an external device.

The operation of the selectors 23a and 23b is described below. Before the laptop 1 is logically connected to an external device via infrared light, the CPU 15 operates the selectors 23a and 23b at constant intervals to switch the channel and poll whether or not there is a connection request from an external device. When an infrared signal is received by the photoreceptor 12, the switching between the selectors 23a and 23b is temporarily stopped, and the channel is fixed at the photoreceptor 12 of the infrared transmission\reception unit 6a, 6b, or 6c receiving the input. When a logical connection has been established with the external device, the channel remains fixed until a connection release command is received. When the connection is interrupted for any reason during transmission, the channels are sequentially switched after a set period to confirm whether or not there is an input signal to another infrared transmission\reception unit 6a, 6b, 6c. This operation is based on the hypothesis that the external device may have moved. Normal operation is restored after the logical connection is released and the process returns to the initial operation, and the selectors 23a and 23b are operated at constant intervals to switch the channels.

Figure 3:
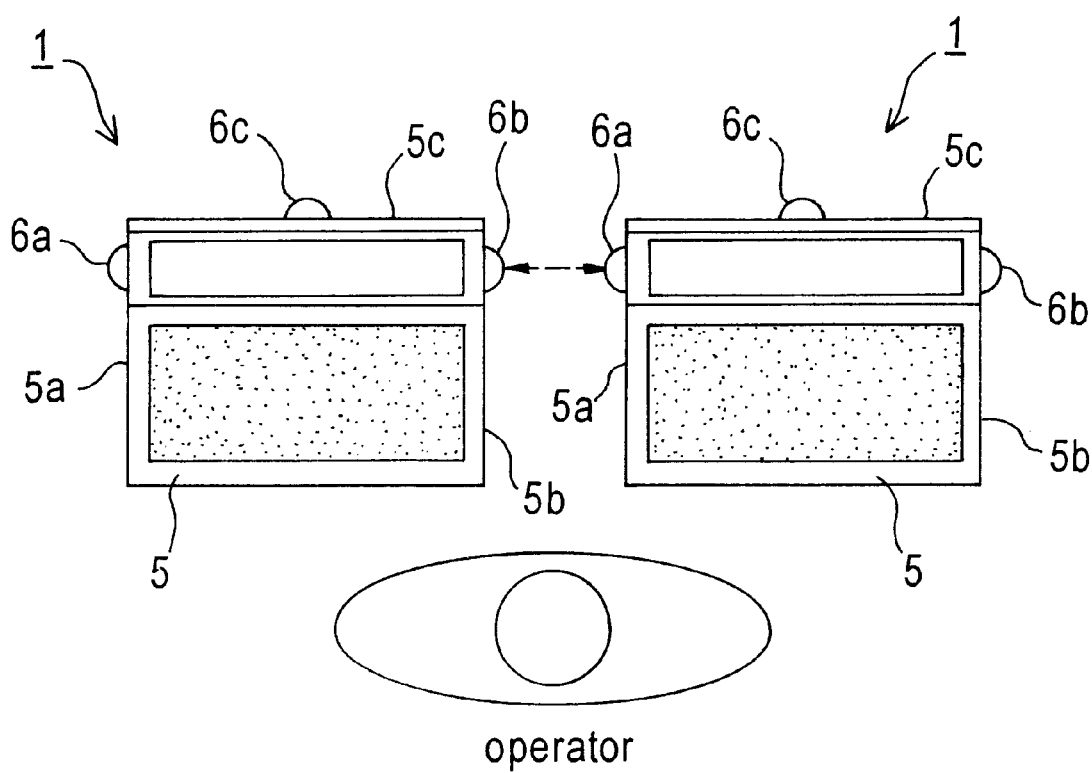
FIG. 3 is a top view showing an example of the disposition of laptop computers during data transmission\reception.

In this way, the laptop computer 1 of the present embodiment is capable of freedom of positioning of the laptop computer 1 and an external device for data transmission because the infrared transmission\reception units 6a, 6b, 6c are provided on mutually different surfaces of the device casing 5. As shown in FIG. 3, two laptop computers 1 can be positioned so as to be aligned side by side facing the same direction. Accordingly, a single person can smoothly operate sat transmission\reception between the two computers. Since the switching operation among the infrared transmission\reception units 6a, 6b, 6c is automatic during reception, an operator can execute a completely identical data transmission operation with a conventional laptop computer provided with a single infrared transmission\reception unit. An infrared transmission\reception unit may also be provided, for example, on both left and right sides of the cover 4, or on a single side thereof.

Second Embodiment

Figure 4:
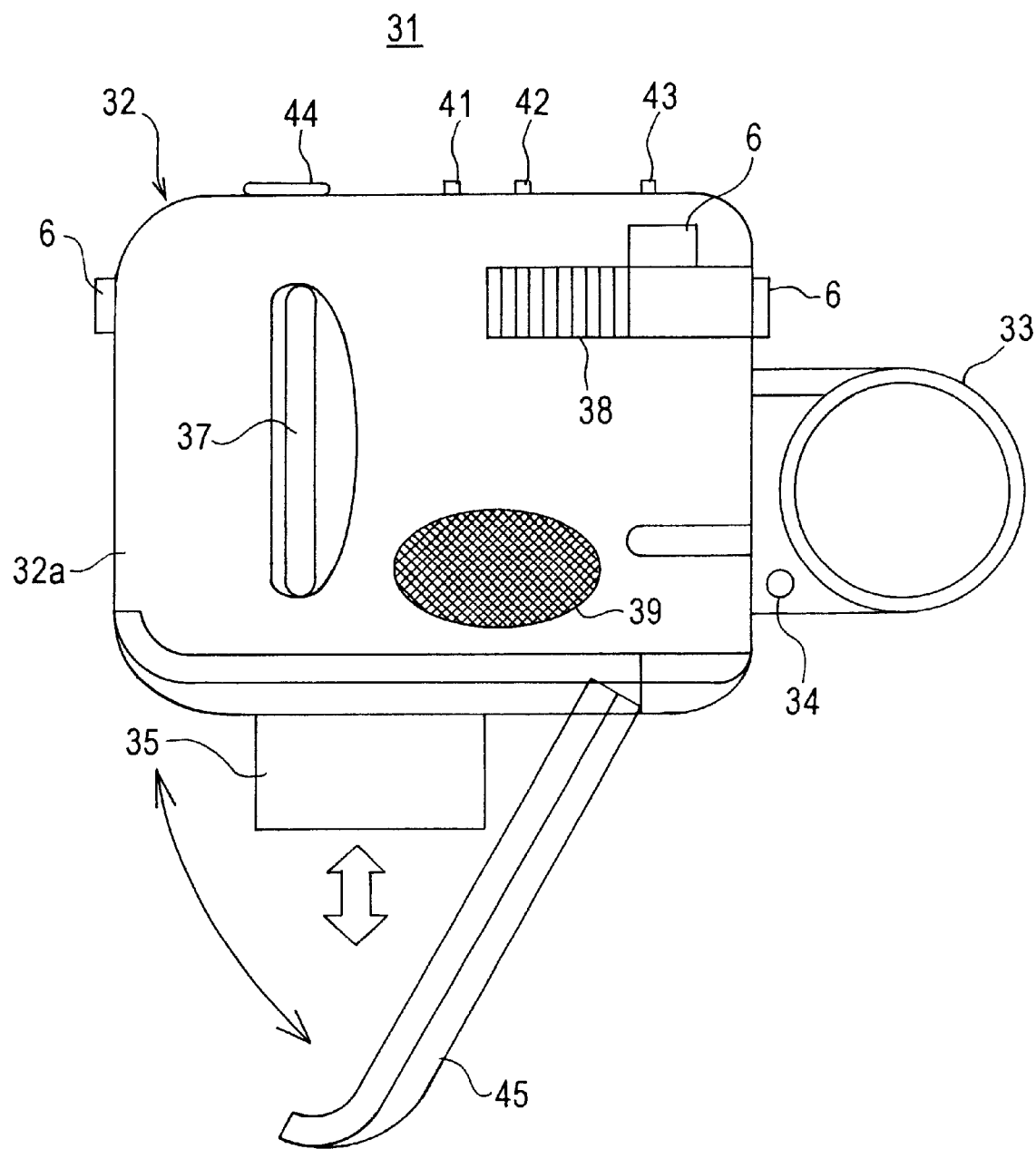
FIG. 4 is a front view of a digital camera provided with an optical communications function of a second embodiment.
Figure 5A:
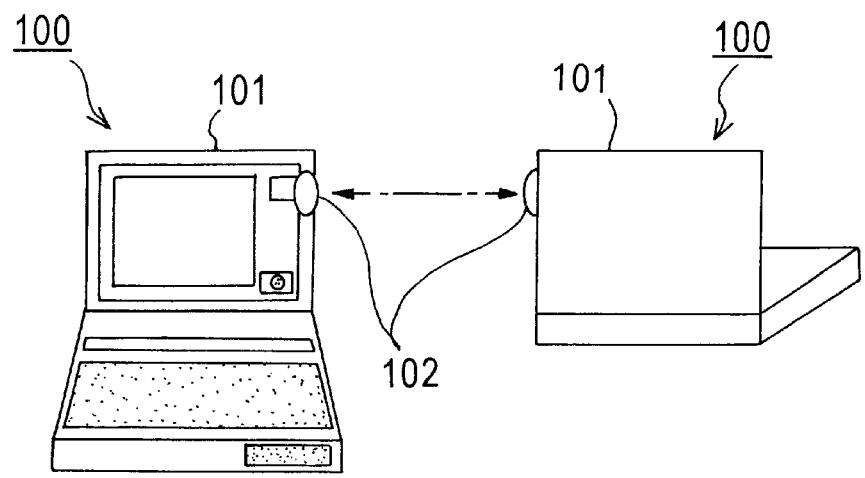
FIGS. 5a and 5b respectively e positional relationship of two laptop computers during a conventional data transmission\reception operation.
Figure 5B:
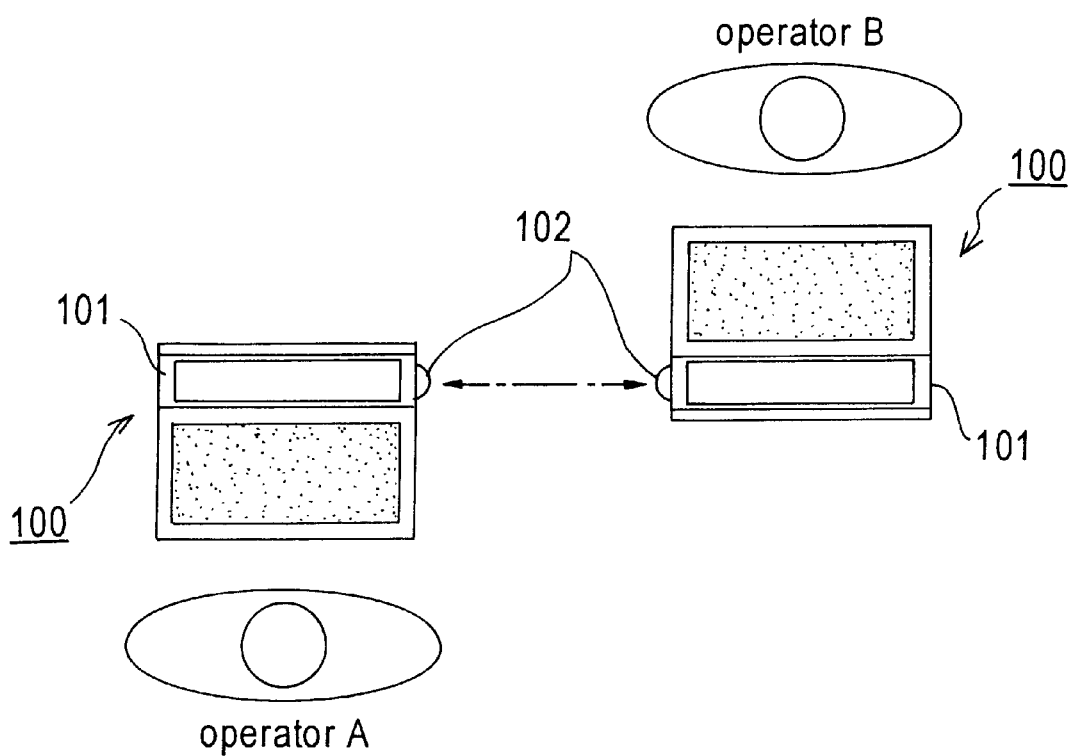
Figure 6:
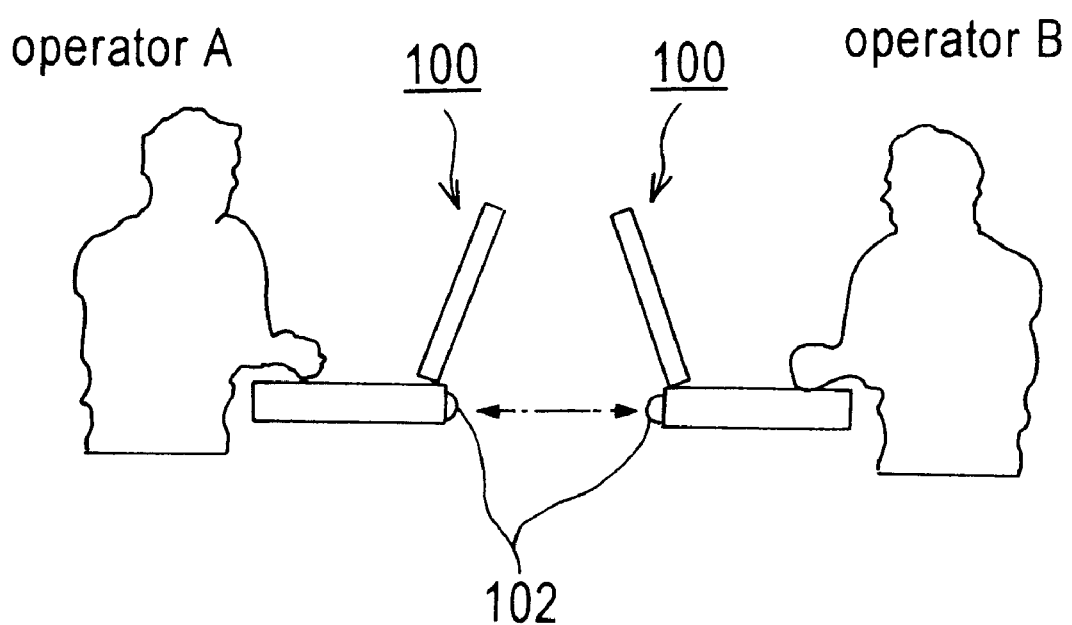
FIG. 6 illustrates the positional relationship of two laptop computers during another conventional data transmission\reception operation.

FIG. 4 is a front view of a digital camera provided with the optical communications function of a second embodiment. The digital camera 31 comprises a box type camera body 32, and a triangular parallelepiped image sensing unit 33. The image sensing unit 33 is removable on the right side of the camera body 32 when viewed from the front, and is installed by rotating within a plane parallel to the right side. The image sensing unit 33 has an image sensing device comprising a photoelectric conversion element such as a CCD (charge-coupled device) and a photographic lens of the macro zoom type, and converts the optical image of the subject to an image of electrical signals optoelectrically converted by each pixel of the CCD. The image sensing unit 33 is provided with a dimmer sensor 34 which receives the light reflected from the subject.

The camera body 32 is provided with a display unit (not illustrated) comprising an LCD (liquid crystal display) and a receiving unit (not illustrated) for a memory card 35, and after predetermined signal processing of the image signals sensed by the image sensor 33, processing is executed such as display on the LCD display and storage to the memory card 35. Infrared transmission\reception units 6 are provided on the right and left side surfaces and front surface of the case 32a of the camera body 32 for transferring images via optical communications with an external device such as a personal computer.

A grip 37 is provided at an appropriate location on the left side of the front surface of the camera body 32, and a internal flash 38 is provided at an appropriate location on the top of the right side thereof. In the approximate center of the front surface a speaker 39 is provided for regenerating voice data. At the center of the top surface of the camera body 32 are provided frame advance switches 41 and 42 for frame advance when regenerating recorded images. The switch 41 is a switch (UP switch) for advancing the recorded images in the direction of increasing frame number (direction of photographic sequence). The switch 42 is a switch (DOWN switch) for advancing the recorded images in the direction of decreasing frame number. An erase switch 43 for erasing an image recorded on the memory card 35 is provided on the right side of the DOWN switch 42 when viewed from the front, and a shutter switch 44 is provided on the left side of the UP switch 41. On the bottom surface of the camera body 32 are provided a battery receptacle (not illustrated) and a card receptacle (not illustrated) for the memory card 35, and the installation aperture of both receptacles is covered by a clamshell type cover 45.

According to the digital camera 31 of the present embodiment, since a plurality of infrared transmission\reception units 6 are provided on mutually different sides of the case 32a of the camera body 32, the digital camera 32 and an external device such as a personal computer may be freely positioned for data transmission. Furthermore, a single person can simply and smoothly perform the data transmission operation between the two devices.

The present invention is not, limited to the previously described embodiments, and may be variously modified. For example, although an infrared transmission\reception unit 6 is provided as a an optical communications port in the previously described embodiments, an optical communications port using laser light may be substituted for the infrared transmission\reception unit 6.

According to he optical communications function of the device of the present invention, since transmission\reception means are respectively provides on at least two different surfaces of the device, the device can be freely positioned relative to an external device for data transmission\reception. As a result, a data transmission operation between two devices can be accomplished easily and smoothly. Particularly during data transmission between two laptop computers provided with an optical communications function, a single person can operate both computers since the two laptop computers can be positioned side by side facing the same direction, thereby allowing the data transmission operation to be accomplished easily and smoothly. Furthermore, when receiving data from an external device, the transmission\reception means receiving the data is discriminated by the control means which fixes the connection between this transmission\reception means and the data conversion unit, thereby making it unnecessary for a user to switch the transmission\reception means via an operation simplifying the data transmission operation.

Although the present invention has been fully described by way of examples with referenced to the accompanying drawings, it is to be noted that various changes and modification will be apparent to those skilled in the art. Therefore, unless such changes and modifications depart from the scope of the present invention, they should be construed as being included therein.

What is claimed is:

1. A device having an optical communications function, comprising:
    a body;
    a plurality of communications units provided on different surfaces of the body for communicating optically with other devices;
    a data conversion unit comprising an encoder for encoding information for transmission from the communications unit to another device and a decoder for decoding encoded information received from another device;
    a selector for selecting one communications unit for handling data with the data conversion unit from among the plurality of communications units;
    a switch for controlling the selector so as to sequentially switch the communications units to handle information with the data conversion unit;
    a detector for detecting which communications unit is receiving a transmission from another device; and
    a controller for stopping an operation of the switch when transmission from another device is detected and executing optical communications using the detected communications units with another device.

2. A device of claim 1, wherein said controller comprises,
    an encoder for encoding information for transmission from the communications unit to another device, and
    a decoder for decoding encoded information received from another device.

3. An optical communication system for a device used for transmitting and receiving data via optical communications with an external device, said system comprising:
    a body;
    a plurality of communications units provided on different surfaces of the body for communicating optically with other devices;
    a data conversion unit comprising an encoder for encoding information for transmission from the communications unit to another device and a decoder for decoding encoded information received from another device;
    a selector for selecting one communications unit for handling data with the data conversion unit from among the plurality of communications units;
    a switch for controlling the selector so as to sequentially switch the communications units to handle information with the data conversion unit;
    a detector for detecting which communications unit is receiving a transmission from another device; and
    a controller for stopping an operation of the switch when transmission from another device is detected and executing optical communications using the detected communications units with another device.

4. A device comprising:
    a plurality of communications units for communicating optically with other devices;
    a processor for processing received data and data to be transmitted;
    a connector for connecting one of the communications unit with the processor;
    a switch for switching a connection with the processor to another connection between another communications unit and the processor sequentially;
    a detector for detecting which communications unit is receiving a transmission from another device; and
    a controller for performing communications using the communications unit detected by the detector with another device without switch operation by the switch.

5. A device of claim 4, wherein said controller comprises:
    an encoder for encoding information for transmission from the communications unit to another device, and
    a decoder for decoding encoded information received from another device.

6. A device having an optical communications function, comprising:
    a plurality of communications units for communicating optically with another device;
    a selector for selecting one of the communications units;
    a controller for controlling the selector to sequentially poll the plurality of communications units as to whether or not a there is a connection request from the other device and to stop the sequential polling when the one of the plurality of communications units indicates receipt of the connection request; and
    an interface for performing communications with the other device using the communications unit that indicates receipt of the connection request.

7. The device of claim 6, wherein
    the interface performs communications with the other device using the selected communications unit until a connection release command is received, and
    the controller controls the selector to renew sequentially polling of the plurality of communications units when a communications connection between the other device and the selected communications unit is broken before receipt of the connection release command.

* * * * *